United States Patent [19]
Lonnemo

[11] 3,742,820
[45] July 3, 1973

[54] POWER TRANSMISSION
[75] Inventor: Kurt R. Lonnemo, Troy, Mich.
[73] Assignee: Sperry Rand Corporation, Troy, Mich.
[22] Filed: Sept. 22, 1971
[21] Appl. No.: 182,675

[52] U.S. Cl.................................. 91/497, 417/214
[51] Int. Cl........................................... F04b 49/00
[58] Field of Search.................... 417/212, 213, 218, 417/221, 222; 91/388, 497; 60/52 VS; 73/211; 91/497

[56] References Cited
UNITED STATES PATENTS
3,165,068  1/1965  Burnham et al. ..................... 91/492
3,296,797  1/1967  Tlusty .............................. 60/52 VS Primary Examiner—William L. Freeh
Assistant Examiner—Gregory LaPointe
Attorney—Theodore Van Meter

[57] ABSTRACT

A displacement adjusting system for a variable displacement pump which delivers in a single direction only utilizes a pair of laminar flow restrictions connected in series in a bleed circuit and operated mechanically by the displacement regulator of the pump to increase one restriction as the other is decreased in proportion to changes in pump displacement. The pressure level at the point between the two restrictors is applied against a variable spring bias on a pilot valve to control a servomotor acting on the pump displacement regulator. The control maintains a maximum on pump input torque under all load variations and this limit is adjustable through the pilot valve spring.

3 Claims, 1 Drawing Figure

PATENTED JUL 3 1973
3,742,820
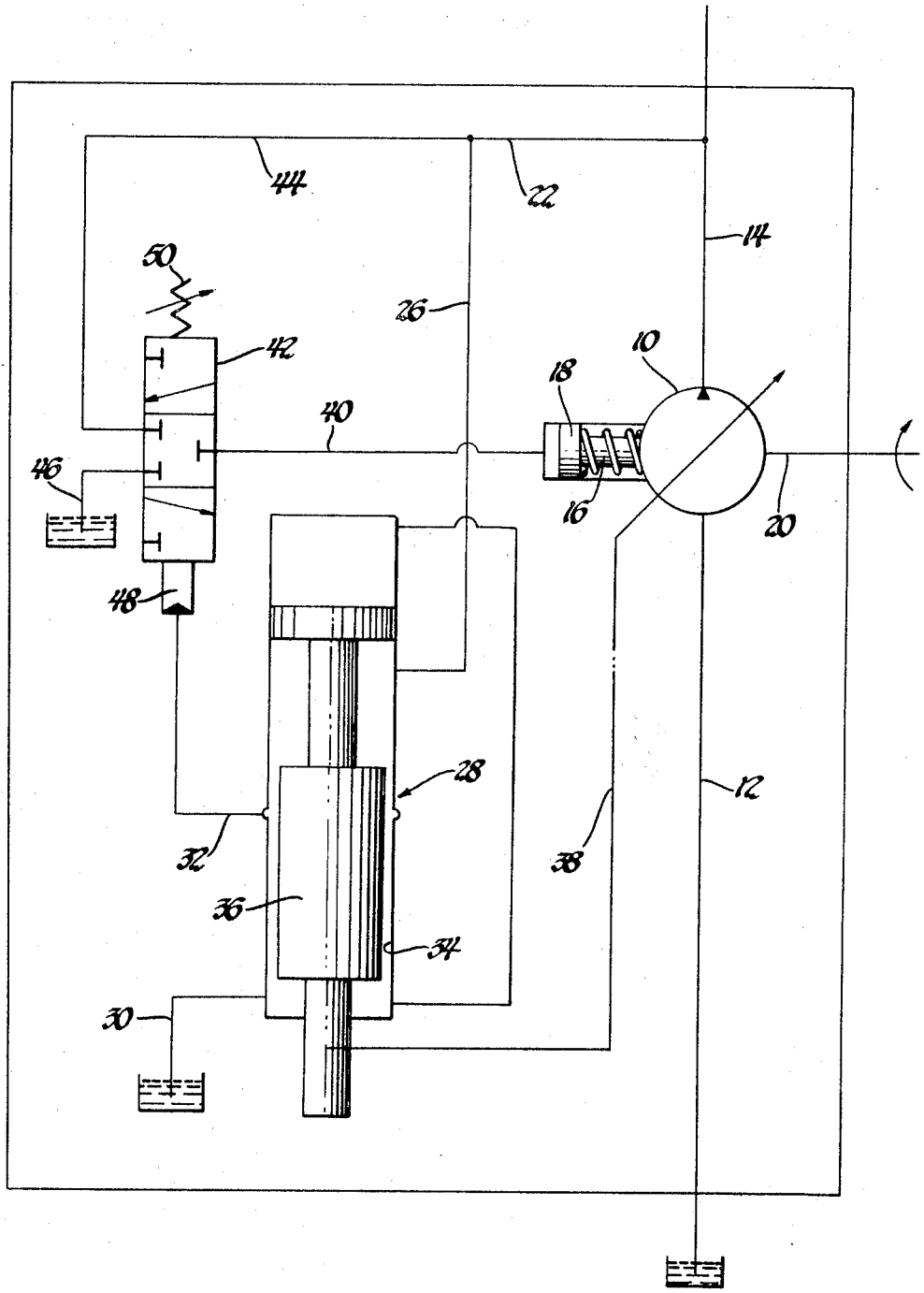
INVENTOR.
BY KURT R. LONNEMO
ATTORNEY

POWER TRANSMISSION

There are many applications of hydraulic variable displacement pumps in which it is desirable to provide a readily adjustable means for limiting the input torque to the pump to any desired value. In my U.S. Pat. No. 3,554,093 of Jan. 12, 1971, I have shown a control system for a similar purpose, but which requires a complicated assemblage of components.

It is an object of the present invention to provide a simple, reliable control for this purpose utilizing a coordinated pair of laminar flow restrictions connected in series for controlling the pump displacement.

The invention comprises a displacement adjusting system for a one-way variable displacement pump having an inlet and an outlet, comprising a member shiftable to change the pump displacement, hydraulic servomotor means to shift the member, means forming a bleed circuit from the outlet to the inlet, a pair of laminar flow restrictions in series in the bleed circuit, means connecting the restrictions to the shiftable member to vary them equally and oppositely in proportion to the movements of the shiftable member, a pilot valve controlling the servomotor, a pilot valve operator connected to respond to the pressure level at the point in the bleed circuit between the two restrictions, and an adjustable resilient biasing means opposing the pilot valve operator, whereby the displacement of the pump will be varied automatically as its loading changes so as to maintain a limit on the torque required to drive the pump, which limit is determined by the setting of the adjustable biasing means.

In the drawing:

The single FIGURE is a circuit diagram of a control system embodying a preferred form of the present invention.

A one-way variable displacement pump 10 is connected to an inlet line 12 and an outlet line 14. The pump has a displacement varying member 16 which may be operated by a servomotor 18, biased to the left by a spring or other biasing means. Pumps of this character are widely used for supplying the operating pressure to hydraulic power systems of various types. The driveshaft 20 of such a pump is connected to a prime mover and, depending upon its type, it is frequently necessary to provide a pump control system which will limit the maximum input torque which the shaft 20 will impose upon the prime mover and to vary that limit at will. For prime movers which maintain substantially constant speed over a wide torque range, such a control will maintain a constant horsepower limit, maintaining a substantially hyperbolic relationship between pump output flow and output pressure.

For this purpose, advantage is taken of the characteristics of laminar flow restrictions which exhibit a constant proportional ratio between the length of the restriction and the pressure drop therethrough. For this purpose, the outlet line 14 has a branch 22 which feeds a bleed circuit and a control pressure circuit. The bleed circuit includes a line 26 feeding a pair of laminar flow restrictors 28 which exhaust through a line 30. A pressure sensing line 32 forms the dividing point between the two laminar flow restrictors. These are constituted by a long cylinder 34 having a shiftable plunger 36 therein with a small clearance space through which fluid passes, first from line 26 to line 32 forming the first restriction and then from line 32 to line 30 forming the second restriction. The plunger 36 is mechanically connected to the pump displacement varying member 16, this connection being indicated diagrammatically by the line 38. This connection may take any of the many known forms. For example, in my prior U.S. Pat. No. 3,554,093 above mentioned, the coaxial relationship between plunger 27 or 27a and the servopiston 34 or 34 a can be used to connect applicant's plunger 36 and servomotor piston 18. Other suitable feedback connections between a pump stroking member and a feedback valve control are illustrated in Doe U.S. Pat. No. 2,177,098 at 42, 56, 54 of FIG. 1 and in Keel U.S. Pat. No. 2,870,746, FIGS. 3 and 4 at 118, 112, 114, and 110. It will be understood that the connection should be such that as the servomotor 18 moves to decrease the pump displacement, the plunger 36 will be moved to decrease the resistance between lines 26 and 32 and simultaneously increase that between lines 32 and 30. Servomotor 18 is controlled through a line 40 by a pilot valve 42 which is a three-way valve receiving control pressure from a branch 44 and exhausting through a line 46. The pilot valve 42 has an operator 48 connected to the line 32 and thus sensing the pressure drop through the first laminar flow restriction. The pilot valve 42 is biased against its operator 48 by a manually variable spring 50.

With the pump operating and delivering fluid through line 14 against variable pressure and volume requirements, the bleed circuit 26–28–30 taps off a continuous small flow. Since the plunger 36 is connected to move with the displacement regulating member 16, it follows that the pressure at line 32 depends upon the delivery line pressure 14 and the ratio of (a) the restriction between lines 26 and 32, and (b) the restriction between lines 32 and 30. This ratio varies with the displacement setting of pump 10. Thus, the pressure at line 32 represents the product of the pump displacement and delivery pressure, which product determines the input torque on the driveshaft 20.

The pilot valve 42 at any particular setting of the spring 50, will maintain this pressure in line 32 at a constant value by shifting up or down to direct fluid into or out of the servomotor 18, thus maintaining a constant level of input torque at the shaft 20. This level may, moreover, be varied readily by merely varying the force of the spring 50 through a convenient screw adjustment or the like.

I claim:

1. A displacement adjusting system for a one-way variable displacement pump having an inlet and an outlet, comprising a member shiftable to change the pump displacement, hydraulic servomotor means to shift the member, means forming a bleed circuit from the outlet to the inlet, a pair of mutually and oppositely adjustable flow restrictions in series in the bleed circuit, means connecting the restrictions to the shiftable member to vary them equally and oppositely in proportion to the movements of the shiftable member, a pilot valve controlling the servomotor, a pilot valve operator connected to respond to the pressure level at the point in the bleed circuit between the two restrictions, and an adjustable resilient biasing means opposing the pilot valve operator, whereby the displacement of the pump will be varied automatically as its loading changes so as to maintain a limit on the torque required to drive the pump which limit is determined by the setting of the adjustable biasing means.

2. A system as defined in claim 1 wherein the flow restrictions have a common movable member.

3. A system as defined in claim 1 wherein the flow restrictions are of the laminar type.

* * * * *